United States Patent
Robinson

(10) Patent No.: US 6,220,410 B1
(45) Date of Patent: *Apr. 24, 2001

(54) DAMPER

(75) Inventor: William Henry Robinson, Eastbourne (NZ)

(73) Assignee: Damping Systems Limited, Auckland (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/564,142

(22) PCT Filed: Jun. 2, 1994

(86) PCT No.: PCT/NZ94/00054

§ 371 Date: Apr. 22, 1996

§ 102(e) Date: Apr. 22, 1996

(87) PCT Pub. No.: WO94/28334

PCT Pub. Date: Dec. 8, 1994

(30) Foreign Application Priority Data

Jun. 2, 1993 (NZ) ...................................... 247771

(51) Int. Cl.$^7$ ...................................................... F16F 7/12
(52) U.S. Cl. ...................... 188/371; 52/167.1; 52/167.8
(58) Field of Search ........................... 188/268, 371, 188/374, 322.5; 267/136, 139, 292, 293; 52/167.1, 167.8

(56) References Cited

U.S. PATENT DOCUMENTS

| 3,721,320 | * | 3/1973 | Hirsch | 188/374 |
| 3,833,093 | * | 9/1974 | Robinson | 188/374 |
| 3,938,625 | * | 2/1976 | Radermacher et al. | 188/322.5 X |
| 5,458,221 | * | 10/1995 | Flux et al. | 188/374 |

FOREIGN PATENT DOCUMENTS

0266841 * 11/1986 (JP) ...................................... 188/371

* cited by examiner

Primary Examiner—Robert J. Oberleitner
Assistant Examiner—Pamela J. Rodriquez
(74) Attorney, Agent, or Firm—Hovey, Williams, Timmons & Collins

(57) ABSTRACT

An extrusion damper for interposing between two members to absorb energy of motion which may be induced between the two comprises an outer jacket (1) surrounding a body of plastically deformable energy absorbing material (3) such as lead and a shaft (2) which moves through the outer jacket to deform the lead during induced motion. The body of lead may be fixed relative to the outer jacket and the shaft has a portion of reduced diameter (2a) which moves through the lead. Alternatively the body of lead may be fixed to the shaft and the outer jacket has a portion of enlarged diameter (21a) through which the energy absorber passes. The body of energy absorbing material may optionally be subjected to approximately hydrostatic pressure preferably exceeding the shear yield stress of the energy absorbing material.

9 Claims, 7 Drawing Sheets

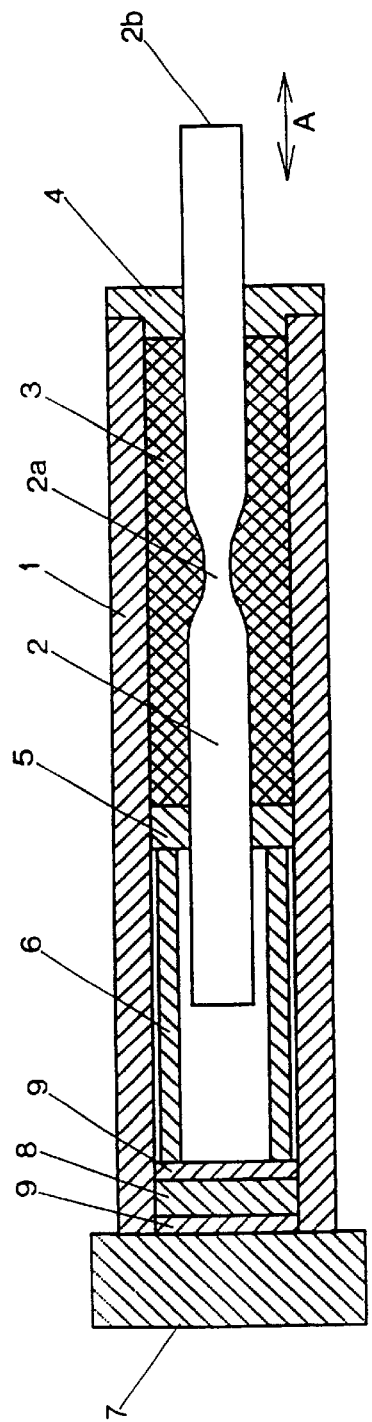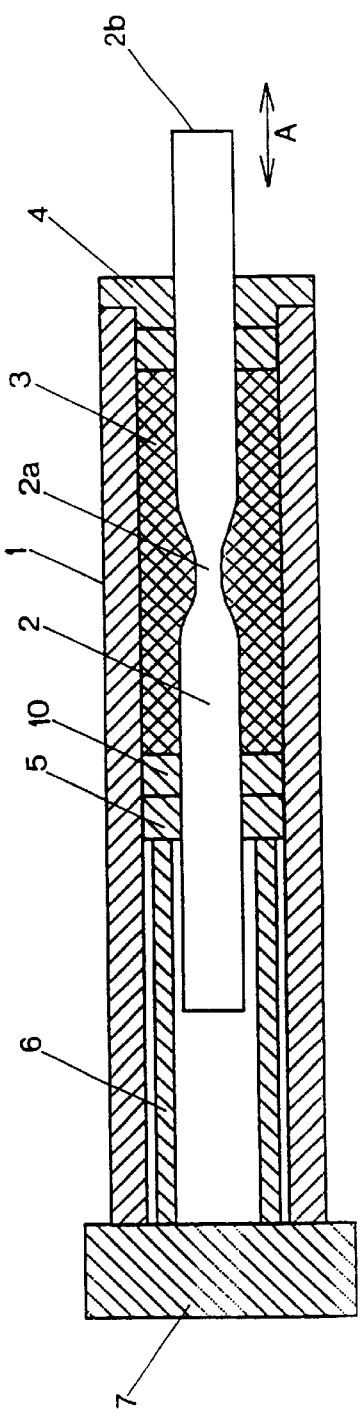
FIG 2
FIG 3

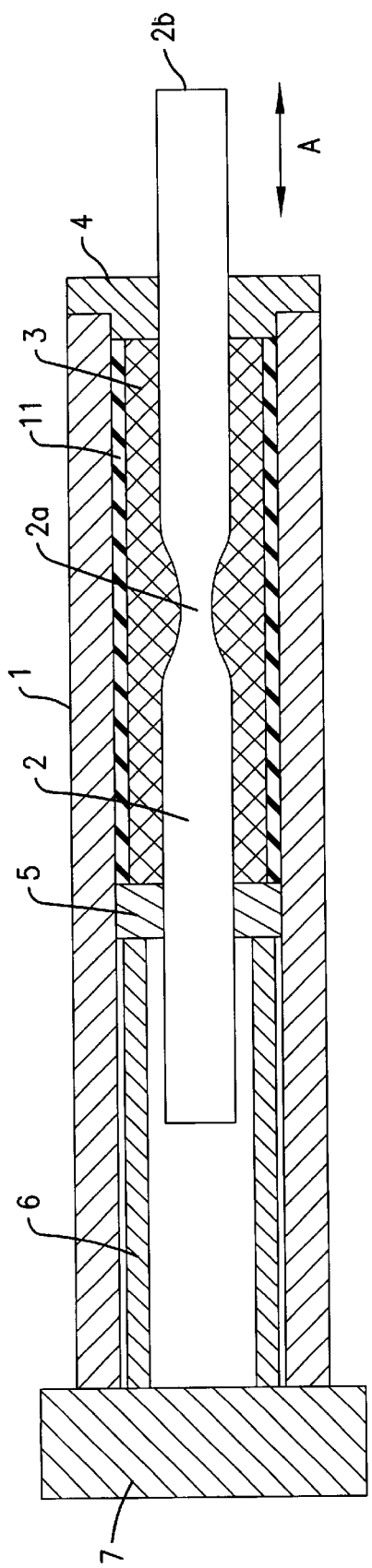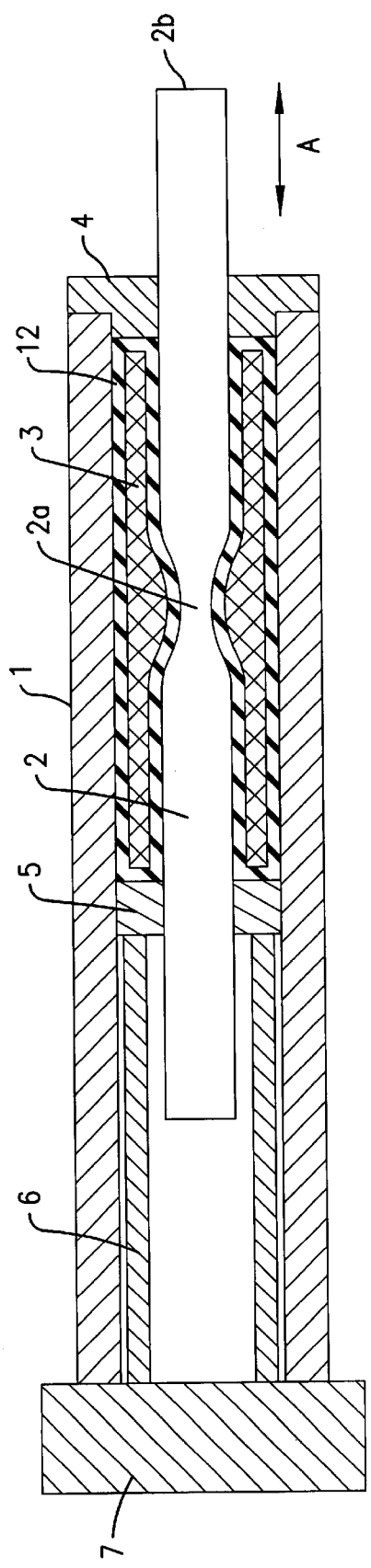
FIG 4
FIG 5

HYDROSTATIC PRESSURE = 0

HYDROSTATIC PRESSURE = $\sigma'_{xy}$

DAMPER

This invention relates to dampers of the type commonly referred to as extrusion dampers, used for reducing the effects of induced motion or displacement in a variety of structures and equipment.

The dampers of the invention may be used in large structures such as bridges or buildings to reduce the effects of motion induced during earthquakes or from strong winds. They may also be used to damp motion of large or small moving objects. They may be used to damp motion in industrial machinery or engines or the like or from domestic appliances such as washing machines for example, or in any other application where it is desired to damp any motion, vibrations or similar. They may be used to damp displacement arising from thermal expansion. The extrusion dampers of the invention have various applications.

BACKGROUND OF THE INTENTION

Devices known as extrusion dampers which employ elastic or plastic deformation of certain materials to absorb energy are well known. U.S. Pat. No. 3,833,093 describes a form of extrusion damper consisting of an energy absorber material confined between an elongate outer jacket which is typically a cylinder, and a shaft which moves longitudinally within the jacket. The absorber material is typically lead while the jacket and shaft are typically formed of steel. Opposite ends of the jacket and shaft are connected between two members in a structure which are expected to move relative to one another during an earthquake or other induced motion. A general discussion of these and related devices is given in "An Introduction to Seismic Isolation", R I Skinner, W H Robinson and G H McVerry, Wiley, 1993.

Lead is the preferred deformable energy absorbing material for several reasons. First it yields at a room temperature shear stress of around 10.5 MPa which is low compared with other metals and equivalent plastic materials. Second it restores its mechanical properties through recrystallisation and associated processes relatively rapidly following yield deformations, which provides outstanding resistance to work hardening under cyclic shear at ordinary temperatures. Third lead is readily available at the purity required to exhibit these properties.

In practice such dampers are individually designed to protect a particular structure against damage by damping certain motions imparted to it. Their behaviour is quite closely approximated by that of an ideal Coulomb damper in having a force-displacement hysteresis loop which is nearly rectangular and practically rate independent over a wide range of frequencies. Research into performance of these devices is ongoing.

SUMMARY OF THE INVENTION

It is an object of the present invention to provide for improved performance of such dampers for seismic isolation and other applications.

The invention broadly comprises a damper for interposing between two members to damp motion which may be induced between the two, comprising an elongate outer jacket means, a shaft passing through the outer jacket which is forced to move through the outer jacket during induced motion and a body of a plastically deformable energy absorbing material filling the space between the outer jacket and the shaft, wherein the body of energy absorbing material is fixed relative to the outer jacket and the shaft comprises a portion of reduced diameter which is forced through the energy absorbing material during said induced motion and/or the body of energy absorbing material is fixed to the shaft and the outer jacket comprises a portion of enlarged diameter through which the body of energy absorbing material is forced during said induced motion.

Preferably the body of energy absorbing material is subjected to approximately hydrostatic pressure at least approaching the shear yield stress of the material. Preferably the hydrostatic pressure applied to the energy absorbing material exceeds the shear yield stress of the energy absorbing material. Preferably the hydrostatic pressure is 5 MPa or more and most preferably in the range 10–100 MPa.

Preferably the energy absorbing material is lead, but other energy absorbing materials which may be used include alloys of lead, aluminium at elevated temperature e.g. about 200° C., tin, zinc, brass, iron, super plastic alloys, or any other material having a low rate of work hardening, including also densely packed granular materials such as steel shot, glass beads, alumina, silica, silicon carbide or any other very hard granular material.

Dampers of the invention may be used in seismic isolation applications to damp seismic motion in large structures such as bridges or buildings or motion from very strong wind buffeting or similar. They may also be used in any other application where it is desired to damp any motion, vibrations, or similar. For example, dampers of the invention may be used to damp motion of engines or other industrial machinery. In domestic applications, dampers of the invention may be used in washing machines or spin dryers or dish washers to isolate vibrations. Small size dampers of the invention may be used as "microisolators" for sensitive electronic equipment such as the mechanism of a video recorder etc or in other similar applications. Numerous applications of the extrusion dampers of the invention are envisaged and the invention is not limited only to seismic isolation dampers.

BRIEF DESCRIPTION OF THE DRAWINGS

Preferred dampers of the invention will be described by way of example with reference to the following drawings, wherein:

FIG. 2 shows the damper of FIG. 1 in longitudinal cross-section, FIG. 3 shows another form of damper of the invention similar to that of FIGS. 1 and 2 in longitudinal cross-section, FIG. 4 shows another form of damper of the invention also similar to that of FIGS. 1 and 2 in longitudinal cross-section, FIG. 5 shows a further form of damper of the invention again similar to that of FIGS. 1 and 2 in longitudinal cross-section.

DESCRIPTION OF PREFERRED FORMS

Figure 1:
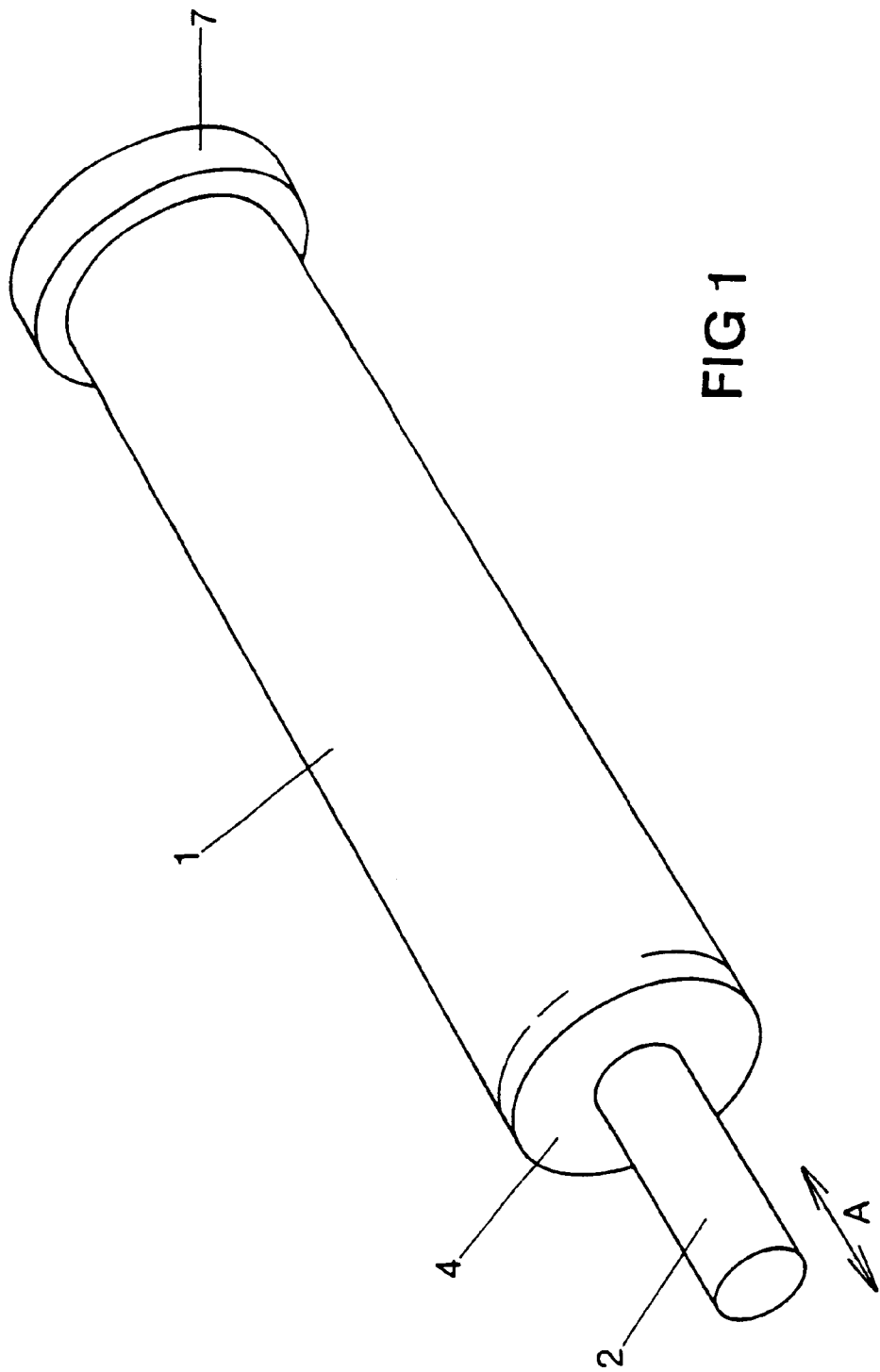
FIG. 1 is a perspective view of one form of damper of the invention in longitudinal cross-section.

The dampers shown in FIGS. 1 to 5 each comprise an outer jacket 1 which is typically formed of steel and may be cylindrical as shown, but could be of other cross-sectional shapes such as oval for example. A shaft 2 is able to move longitudinally through the outer jacket 1 in the direction of arrow A in each case. It is not necessary for the shaft to be positioned centrally within the outer jacket 1, but it could instead be off-set somewhat. The shaft is also typically formed of steel.

The space between the outer jacket 1 and shaft 2 is filled with a plastically deformable material such as lead so that in use the shaft moves through the lead.

The shaft 2 moves through end cap 4 which also forms a bearing for one end of the shaft and bearing 5 on the other side which floats. A tubular spacer 6 is provided between an end cap 7 and the floating bearing 5.

A central part shaft 2 of the shaft 2a has a reduced diameter as shown. FIG. 1 shows the damper from the exterior while FIGS. 2 to 5 show the damper in longitudinal cross-section showing variations in construction which will be referred to further later.

In use the outer jacket 1 of the damper is coupled to one member of a building or other structure through a suitable mechanical coupling, and the shaft is coupled to another member, through the end 2b of the shaft, which may move relative to the first in an induced motion. During such motion such as an earthquake in a seismic isolation application, the shaft 2 and in particular the reduced diameter part 2a is forced through the deformable material 3 such as lead, which creates a damping effect by conversion of kinetic energy to plastic deformational energy and heat, and further heat during recrystallization and other spontaneous recovery processes.

The energy absorbing material may optionally be pre-stressed under an approximately hydrostatic pressure at least approaching and preferably exceeding the shear yield stress of the material so that the material will always be in compression. With lead pressures of 5 MPa or more, typically 10 MPa to around 30 MPa, but also up to 100 MPa or more have been found effective.

Figure 7:
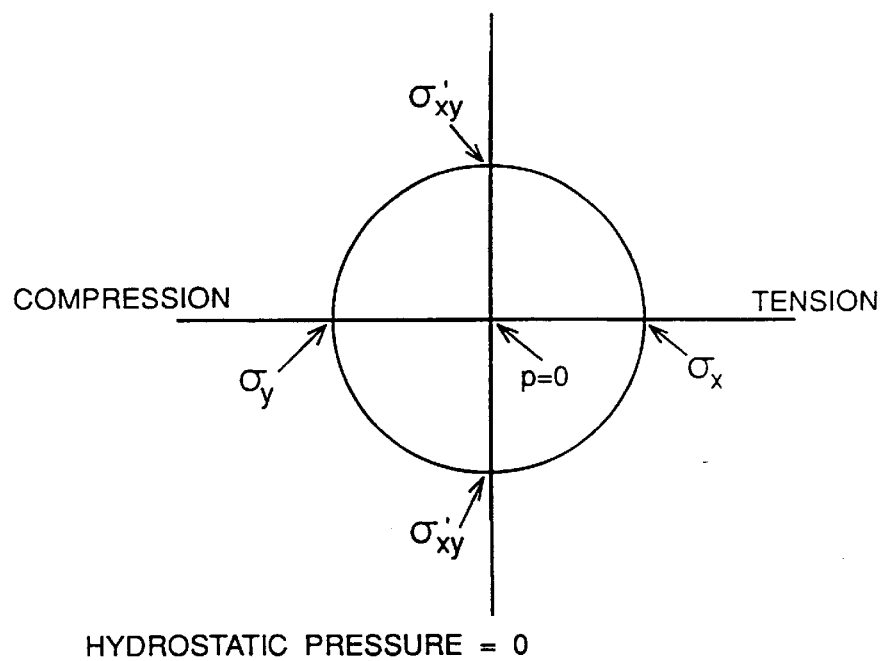
FIGS. 7 and 8 are Mohr circle constructions which will be referred to further in description of the extrusion dampers of the invention.
Figure 8:
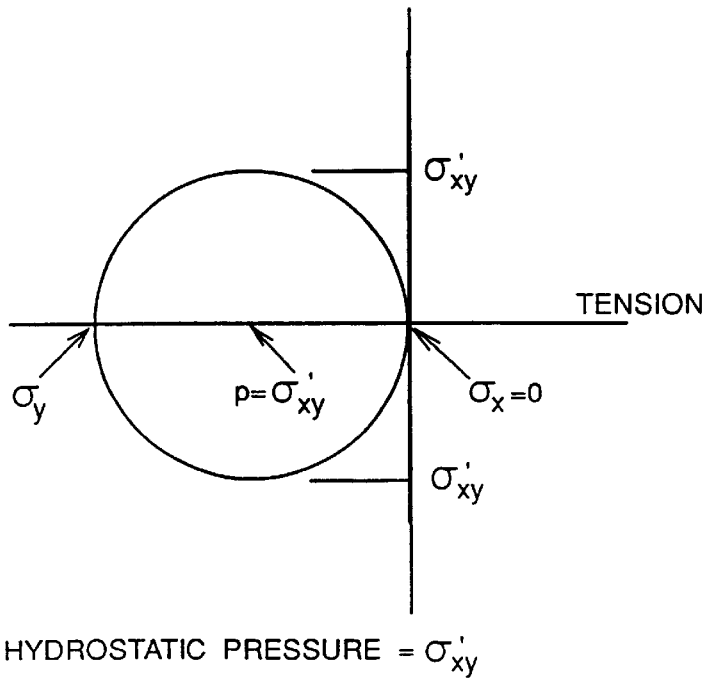

The effect of a hydrostatic pressure may be explained briefly by way of the Mohr circle constructions shown in FIGS. 7 and 8, which enables the properly tensor description of stress to be represented in two dimensions. A hydrostatic pressure applied to a body is then defined as one third the sum of the three principal stresses which act upon it. In FIG. 7 the hydrostatic pressure is 0, and the principal tensile stress $\sigma_x$, the principal compressive stress $\sigma_y$ and the maximum shear stress $\sigma'_{xy}$ are all equal in magnitude. In FIG. 8 a hydrostatic pressure p equal to the shear stress $\sigma'_{xy}$ has been applied. The maximum tensile stress is then 0 so that the body is always under compression. Therefore the body cannot fail in tension.

Returning to FIGS. 2 to 5 a number of alternative arrangements for applying hydrostatic pressure to the lead 3 (or other energy absorbing material) are shown. In FIG. 2 a block comprising layers of an elastomeric material 8 such as rubber and rigid material 9 such as steel is provided between the tubular spacer 6 and the end cap 7. In FIG. 3 a pad 10 of elastomeric material such as rubber is provided at either end of the absorber material 3. In both cases the length of the spacer 5 is such that when the end cap 4 is screwed home, the desired hydrostatic pressure is applied to the lead 3. In FIG. 4 the exterior of the body of absorber material 3 is surrounded by a sleeve of elastomeric material such as rubber or reinforced rubber or other resilient material. In FIG. 5 the absorber material is entirely encased in such a layer of elastomeric material 12.

In each case the energy absorbing material 3 may be cast directly into place within the outer jacket 1 and around the shaft 2. In the embodiments of FIGS. 4 and 5 the rubber sleeve or casing may be stretched around the lead body after casting around the shaft and the shaft and lead then press fitted into the outer casing. Alternatively the lead may be cast as a plug with a constant diameter bore through the lead. The lead plug may then be inserted into the outer casing and the shaft then pressed into the central bore through the lead. Pressure may then be applied to the lead, for example by fitting of the end cap 4 or equivalent, to compress the lead to cause the lead to move to surround the reduced diameter part 2a of the shaft completely.

As stated the damper may be cylindrical or alternatively oval, square, rectangular or any other desired shape in overall cross-sectional shape.

The shaft and also other parts of the damper may optionally be coated with teflon, porcelain, titanium nitride, a hard ceramic material, glass, or similar.

Preferably during assembly of the dampers the component parts are coated with a high temperature/pressure grease or other lubricant.

Figure 6:
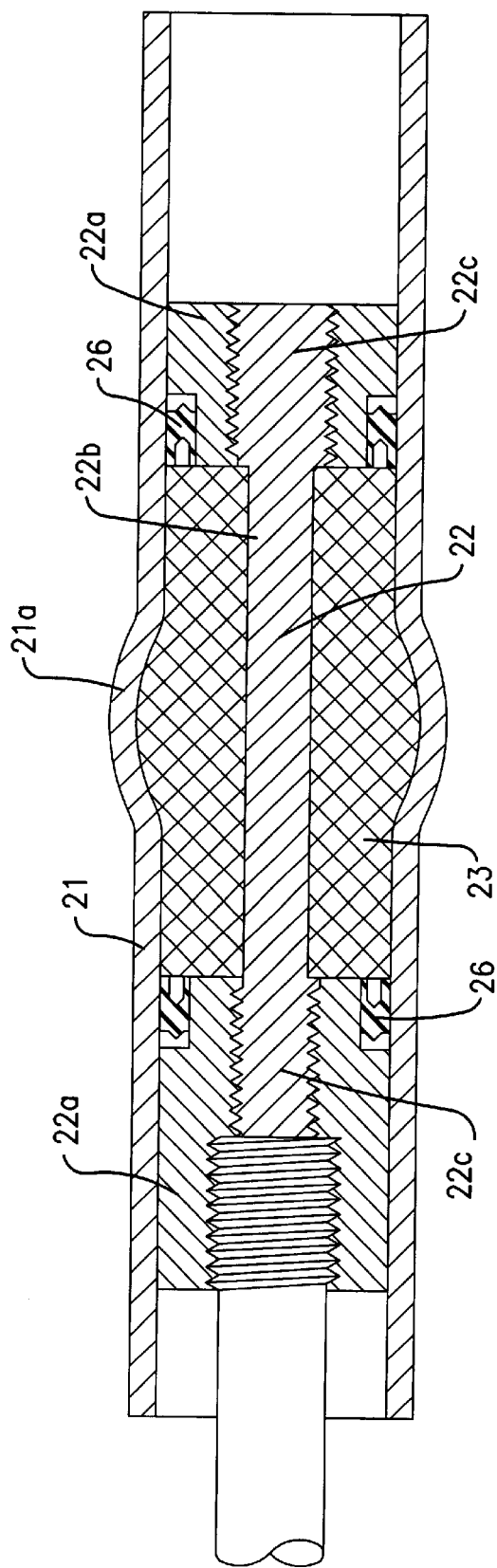
FIG. 6 shows another form of damper of the invention in longitudinal cross-section.

FIG. 6 shows another type of damper of the invention. Again the damper comprises an outer jacket 21 typically formed of steel which is desirably cylindrical but could be of other cross-sectional shapes. One part of the outer jacket 21 is formed with a portion 21a of enlarged diameter as shown. A shaft 22 which is enlarged at either end 22a passes through the outer jacket 21. The ends 22a of the shaft form plungers within the outer jacket 21. Seals 26 such as chevron seals may be provided to seal the plunger parts 22a of the shaft against the internal bore of the outer jacket. Parts of the plunger ends 22a of the shaft 22 are shown in cross-section. The end of the shaft extends out of the outer jacket further than shown in the drawings on at least one side, to enable the shaft to be coupled into position in use. The shaft has a reduced diameter centre part 22b. In the drawings the shaft is shown as a three part shaft with the reduced diameter centre part 22a threading into the larger diameter parts 22b of the shaft at either end, as indicated at 22c.

A body of lead 23 or other energy absorbing material is fixed around the reduced diameter part 22b of the shaft 22. The lead may be subjected to hydrostatic pressure by screwing the plunger ends 22a onto the centre shaft part 22b to apply the desired pressure to the lead, which is also confined within the outer jacket 1. Other arrangements are possible.

In use the outer jacket 21 is coupled to one member of a building or other structure, and one or both ends of the shaft 22 are attached to another member which may move relative to the first in an induced motion. During such motion such as an earthquake in a seismic isolation application, the shaft 22 moves relative to the outer jacket 21, as it does so forcing the body of lead 23 through the interior of the outer jacket 21 including the enlarged diameter portion 21a in the outer jacket, creating a damping effect by conversion of kinetic energy to plastic deformational energy, and to further heat during recrystallisation and other spontaneous recovery processes.

Again the shaft and also the interior of the outer jacket may be coated with teflon, porcelane, titanium nitride etc and the component parts of the damper may be coated with a high temperature grease during assembly, as referred to previously.

The following test of a damper of the invention further illustrates the invention:

TEST

Figure 9:
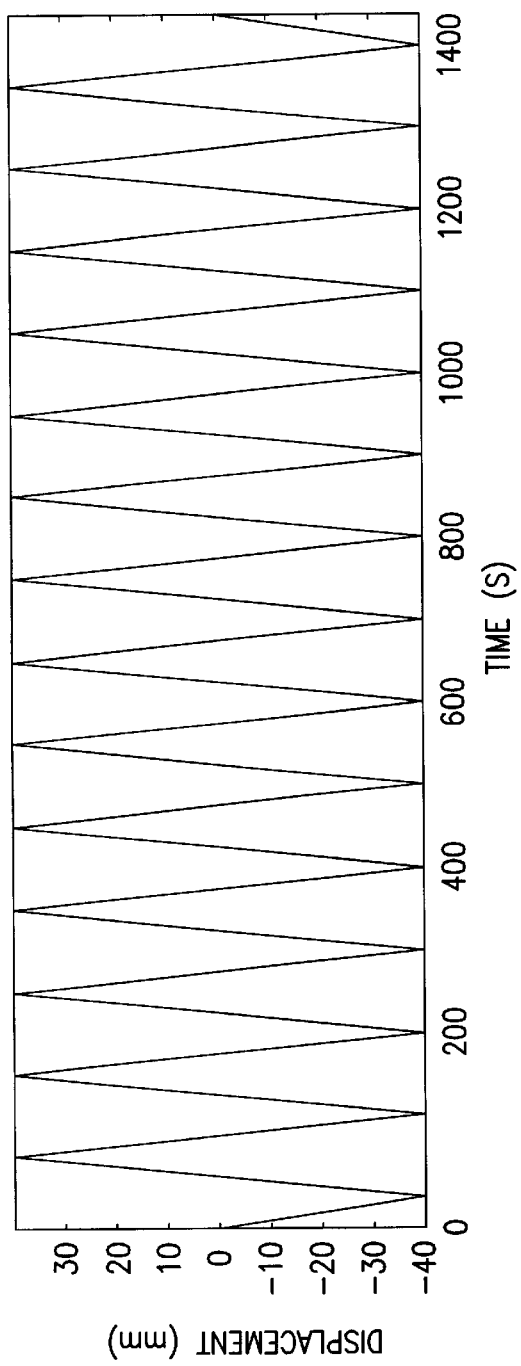
FIG. 9 is a graph of shaft displacement against time graphically illustrating testing applied to a damper of the type shown in FIGS. 1 to 5.
Figure 10:
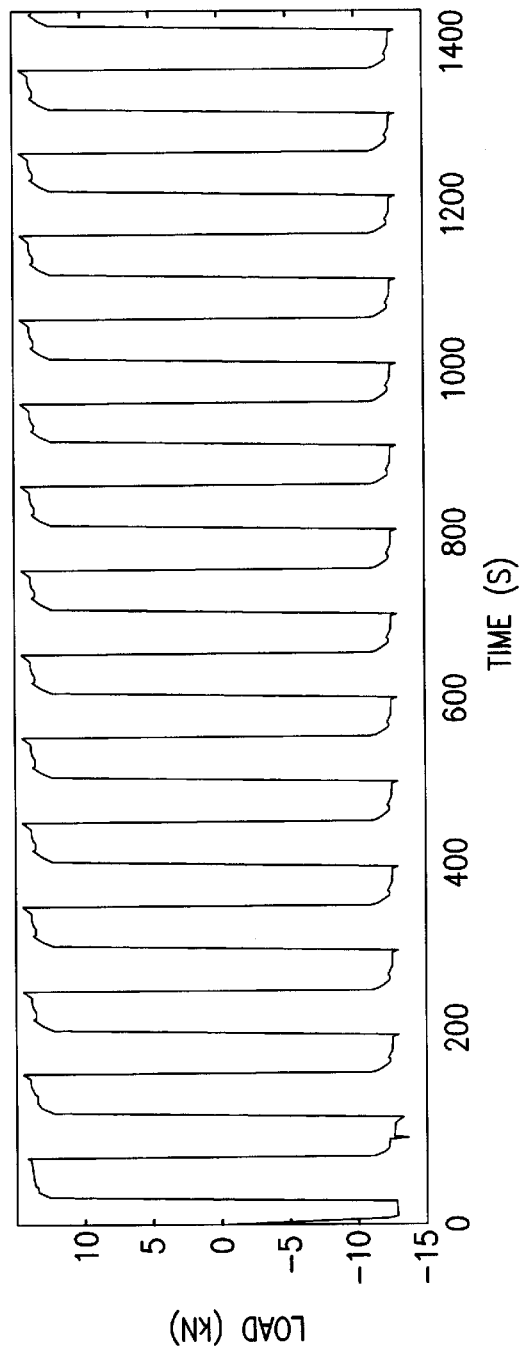
FIG. 10 is a graph of load resistance exhibited against time for a damper of the type shown in FIGS. 1 to 5 subjected to the displacement cycling of FIG. 9.
Figure 11:
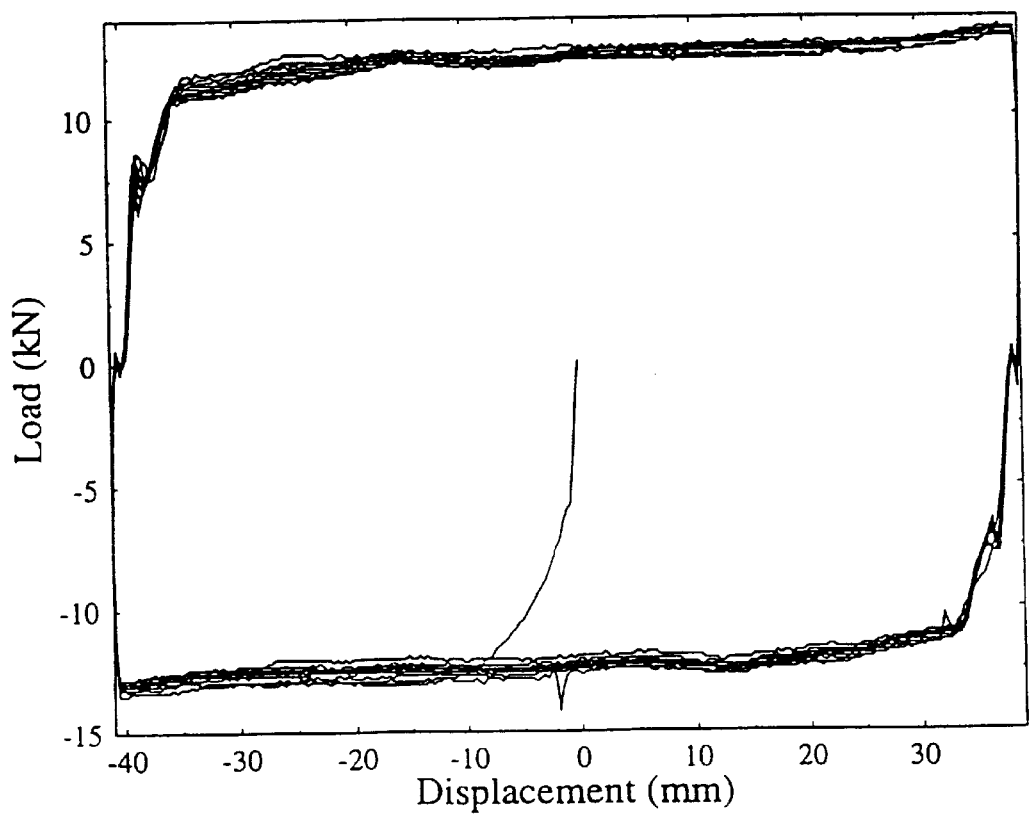
FIG. 11 is a graph of load resistance exhibited during the test cycling of FIG. 9 against displacement showing successive hysteretic loops for successive cycles.

A damper was constructed comprising a cylindrical outer jacket of steel of internal diameter 40 mm. The shaft was a cylindrical steel shaft of 19 mm diameter with a central portion 20 mm long in which the diameter of the shaft reduced smoothly to 12 mm minimum diameter and then increased back to the normal diameter of the shaft. Lead of 99.9% purity was cast into place between the outer jacket and the centrally positioned shaft to surround the shaft within the outer jacket. The length of the lead slug fixed within the casing and surrounding the shaft was 130 mm. Before casting the lead into place the shaft was coated with a high pressure lubricant. When the end cap of the outer jacket was screwed home the lead was subjected to approximately 20 MPa hydrostatic pressure. An Instron testing machine subjected the damper to cycles of shaft movement of displacement of ±195 mm with a maximum cross head speed of 200 mm/minute and a maximum force of 250 kN. The results were recorded directly on a chart recorder connected to the Inston and by a data logger. FIG. 9 shows shaft displacement against time. FIG. 10 shows the load resistance exhibited by the damper, against time. FIG. 11 shows the load resistance exhibited by the damper against displacement, showing successive hysteretic loops for successive cycles. After extended testing the damping force and energy absorbed per cycle were still within 20% of the starting values. At the completion of extended testing the damper was removed from the test rig and disassembled. The lead was visually inspected and found to be in good condition.

The foregoing describes the invention including various preferred forms thereof. Alterations and modifications as will be obvious to those skilled in the art are intended to be incorporated herein as defined in the claims.

What is claimed is:

1. A damper for interposing between two members to damp motion which may be induced between the two, comprising an elongate outer jacket, a shaft passing through the outer jacket which is forced to move through the outer jacket during induced motion, and a body of an energy absorbing material substantially completely filling the space between the outer jacket and the shaft, wherein either the body of energy absorbing material is fixed relative to the outer jacket and the shaft includes a maximum diameter within the jacket and an operative portion of reduced diameter relative to said maximum diameter and formed by an arcuate wall portion having a radius of curvature greater than said maximum diameter, said energy absorbing material being inflexible and normally solid but damping movement of the shaft through the energy absorbing material occurs when the centre portion of the shaft is forced to move through said energy absorbing material during said induced motion, by a process of plastic deformation and recrystallisation of the energy absorbing material, or the body of energy absorbing material is fixed to the shaft and the outer jacket comprises an operative portion of an enlarged diameter relative to the diameter of the outer jacket on either side of said operative portion of the outer jacket, said energy absorbing material being forced through said operative portion of the outer jacket during said induced motion, said energy absorbing material being inflexible and normally solid but damping movement occurs when the shaft and the body of energy absorbing material fixed thereto are forced to move through said operative portion of the outer jacket during said induced motion by a process of plastic deformation and re-crystallisation of the energy absorbing material.

2. A damper according to claim 1, wherein the body of energy absorbing material is subjected to approximately hydrostatic pressure at least approaching the shear yield stress of the energy absorbing material.

3. A damper according to claim 1, wherein the body energy absorbing material is subjected to hydrostatic pressure exceeding the shear yield stress of the energy absorbing material.

4. A damper according to claim 3, wherein the energy absorbing material is formed of lead.

5. A damper according to claim 3, wherein the shaft and/or the interior of the outer jacket is coated with teflon, porcelane, titanium nitride, or other ceramic material, or glass.

6. A damper according to claim 1, wherein the body of energy absorbing material is subjected to hydrostatic pressure of 10 MPa or more.

7. A damper according to claim 1, wherein the body of energy absorbing material is subjected to hydrostatic pressure exceeding 20 MPa.

8. A damper for interposing between two members to damp motion which may be induced between the two, comprising an elongate outer jackets a shaft passing through the outer jacket which is forced to move through the outer jacket during induced motion, and a body of an energy absorbing material substantially completely filling the space between the outer jacket and the shaft, wherein either the body of energy absorbing material is fixed relative to the outer jacket and the shaft is of substantially constant diameter within the jacket except for a single operative portion of reduced diameter, or the body of energy absorbing material is fixed to the shaft and the outer jacket comprises an operative portion of an enlarged diameter relative to the diameter of the jacket on either side of said jacket operative portion.

9. The damper of claim 8, wherein said single operative portion of reduced diameter is defined by an arcuate wall portion.

* * * * *